March 28, 1967  H. G. HOEHMANN  3,311,321
CELL STORAGE AND PNEUMATIC TRANSPORT SYSTEM
Filed Oct. 1, 1965  2 Sheets-Sheet 1
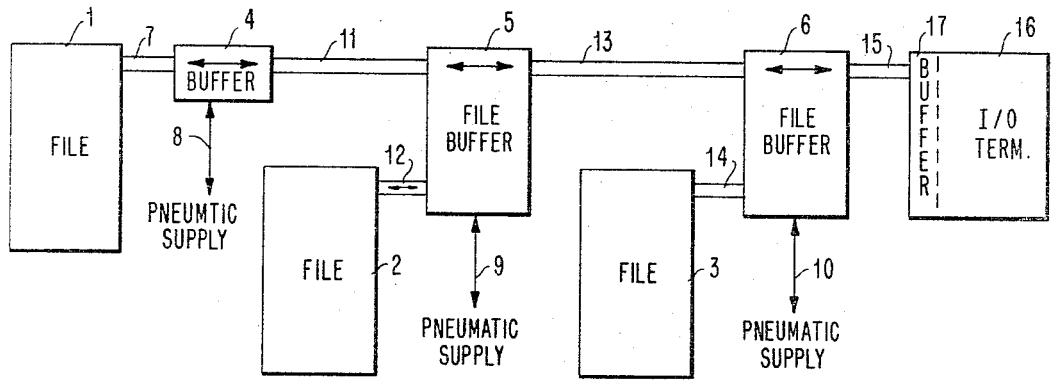
FIG. 1
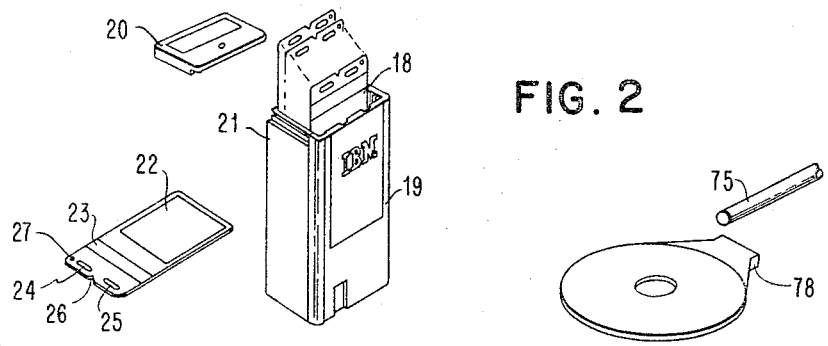
FIG. 2
FIG. 2A
FIG. 5
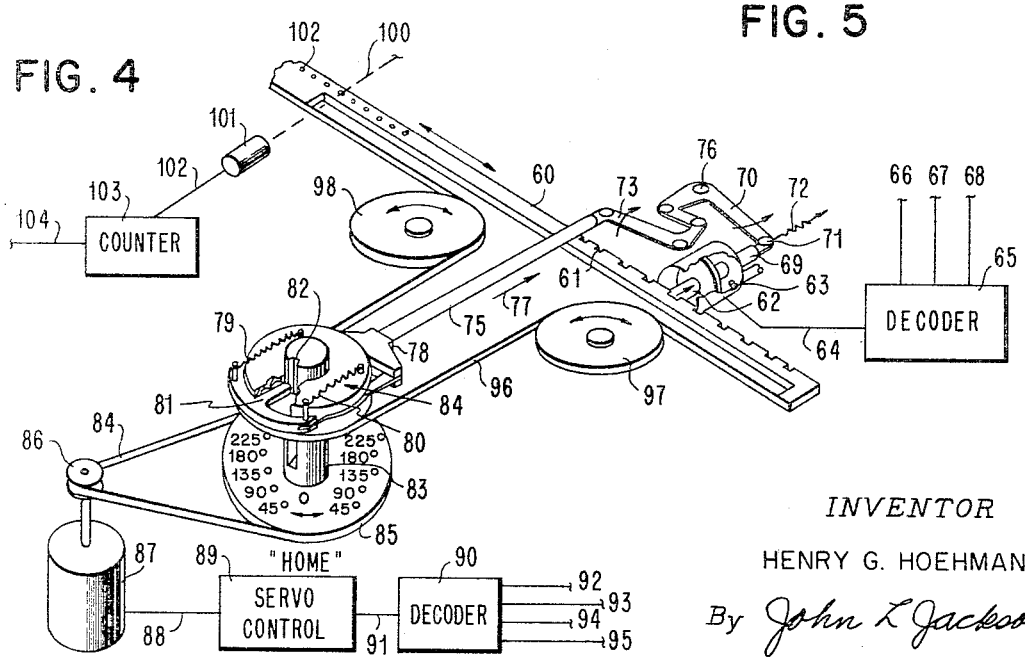
FIG. 4
*INVENTOR*
HENRY G. HOEHMANN
By John L Jackson
ATTORNEY

United States Patent Office 3,311,321
Patented Mar. 28, 1967

3,311,321
CELL STORAGE AND PNEUMATIC TRANSPORT SYSTEM
Henry G. Hoehmann, Los Gatos, Calif., assignor to International Business Machines Corporation, Armonk, N.Y., a corporation of New York
Filed Oct. 1, 1965, Ser. No. 492,085
11 Claims. (Cl. 243—1)

This invention relates in general to pneumatic conveying systems and more particularly to a storage system wherein the basic storage media is small units or chips which are stored in cells which in turn are stored in drawers in a bulk file for selective accessing and transportation pneumatically to an input/output station through buffers associated with each of the files.

The art of pneumatic conveying is a relatively old art. Techniques of pneumatic conveying were developed many years ago for use in the department store type of application. Usually in this type of system two conveying tubes were provided between a number of user terminals and a central terminal such as the billing department. One of the tubes was used for transporting carriers from the user terminals to the central terminal while the other tube was used for conveying carriers from the central department to the various terminals. Routing means were provided on the carriers which set up pneumatic and mechanical paths for the carriers from the central terminal to the various remote user terminals.

While the above mentioned type of conveying system was satisfactory in a relatively low throughput type application, obviously in a high throughput operation, this method of providing a single effective pneumatic path from a terminal to a central location would not be suitable. For instance, in a patent application entitled, "Air Flow Control and Cell Deflector Blade System with Direct Access Matrix," Ser. No. 423,015, by Walter L. Grabowski, Bjarne Junge and Elwood H. Storm, a file system is provided wherein a number of carriers are stored in drawers for selective accessing and conveying pneumatically to a remote I/O terminal. The pneumatic flow of this type of system is entirely satisfactory where a single file of drawers is utilized. That is, where a single file is used, only one pneumatic forward path and one pneumatic return path need be used since no overlap of file operation is needed. However, where a number of files are used which selectively output and input cells to and from a remote I/O terminal, pneumatic conveying problems arise. Thus, when a cell is to be withdrawn from a file, if the entire pneumatic path from the file to the I/O terminal is tied up, efficient operation is not achieved and access times in larger systems becomes intolerable. This, however, is the usual case in the single file, single I/O system wherein a single pneumatic source provides the means for propelling a selected cell through the pneumatic system between the file and the I/O terminal. Attempts to increase the efficiency of this type of system have been made. One such attempt at increased efficiency was to provide a buffer at the I/O terminal such that a number of cells could be withdrawn from the file and be held at the terminal for processing before the pneumatic system was reversed to return the cells to the file.

A high capacity storage system obviously require a number of files with at least one I/O terminal for servicing the cells. As previously pointed out, if, in conveying a selected cell from a file, the entire pneumatic path between the file and the I/O terminal is tied up, no overlap of operation can be provided such that the pneumatic system is relatively inefficient. Ideally, then, in the multi-file system, each of the files should be separated from the main pneumatic system by means of a buffer. The buffer should be placed relative to its associated file such that when it receives a cell from the main transport tube of the system, it can immediately accept the cell from the tube and then completely isolate its own file I/O pneumatics from the main transport system while it returns the cell to its file, such that other cells from other files can simultaneously move through the main transport system. Additionally, the *common* path traveled by each of the cells to and from the I/O terminal should be relatively short since only one cell can be in this section of the transport system at a time. Likewise, the buffers associated with each of the files should be of the high response type such that whenever an individual buffer seizes control of the main transport system for conveying a cell from its associated file to the I/O terminal through the main transport system or vice versa, the transaction takes place rapidly.

Another feature which is important in the multi-file storage system is that when a file is not in active communication through its buffer with the I/O terminal, complete isolation of a file from the main transport pneumatic system should be obtained such that pneumatic transport within the file of cells for rearranging purposes or cell transport between the buffer and the file can take place. This, again, could not occur in a system where the sole pneumatic supply is through the main transport system to the file. Thus, an important feature is the provision of an effective pneumatic transport supply for each of the files whether or not the file is in active communication with the I/O terminal.

It is therefore an object of the present invention to provide a novel storage system wherein carriers are transported from a file to an I/O terminal through an intermediate buffer statge.

Another object of the present invention is to provide a new storage system wherein chips are stored in cells which are conveyed from files to an I/O terminal for processing and then returned to the files.

Another object of the present invention is to provide a novel pneumatic conveying ssytem for selectively coupling a plurality of files pneumatically and mechanically to an I/O terminal.

Another object of the present invention is to provide a multi-file pneumatic storage and retrieval system wherein a number of files containing cells may selectively communicate with an I/O terminal through individual buffers associated with each of the files which pneumatically isolate the file from the main pneumatic system when another of the files are in pneumtaic communication with the I/O terminal.

Other and further objects and advantages of the invention will be apparent from the following more particular description of the preferred embodiment of the invention as illustrated in the accompanying drawings in which:

FIG. 1 is a block systems view of the overall image storage and retrieval concept herein described;

FIG. 2 is an isometric view of a cell which carries chips as the basic storage media;

FIG. 2A is a view of a chip which is contained or carried in the cells of FIG. 2;

FIG. 4 is a view of the tray or drawer drive which may be utilized in conjunction with the drawers of the file of FIG. 3 to accomplish selective positioning thereof;

FIG. 5 is a partial view of the apparatus of FIG. 4 shown with the tray drive positioned other than at the home position.

Figure 3:
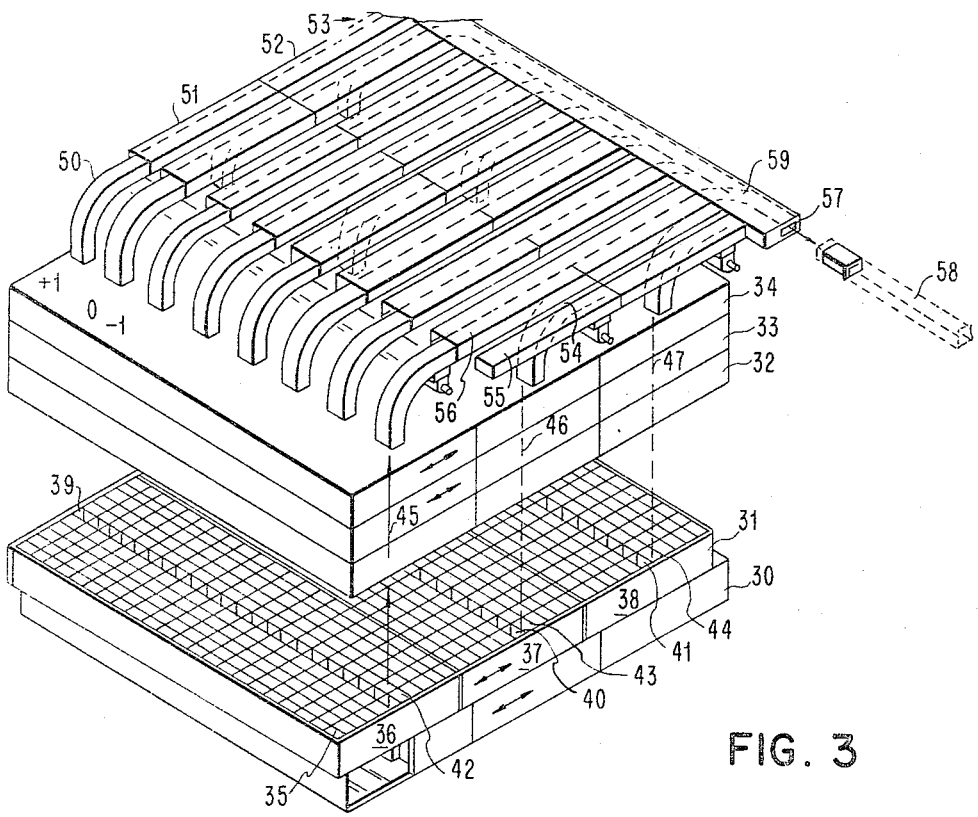
FIG. 3 is an isometric view of a file which may be used in the herein described system along with means for selectively accessing any of the delivery channels of the file to connect any cell pocket with the single file I/O tube.

Briefly, the herein described storage system includes at least one file containing chips as the basic storage media which may carry either image or magnetic information or both. A plurality of chips are contained in a box-like cell and a plurality of cells are in turn contained in a tray. A number of trays are suspended one above the other to make a file and each tray contains, in the embodiment described, three empty columns of delivery channels for the through passage of cells. Each tray may be selectively driven back and forth in discrete steps to position a desired cell in alignment with the communicating through passages in the trays above it. A network of pneumatic tubes is carried in a deck above the top tray and the tubes are also selectively movable to form a continuous passage up through the trays and out of the file for a selected cell. After being transported out of its filed via the pneumatic passage, a selected cell then enters the file buffer. The pneumatic supply to the file is through the file buffer which effects transport of cells between the file and the file buffer. The buffer not only acts as a source of pneumatic supply to the file and its associated pneumatic section to cause passage of a cell between the file and the file buffer, but, additionally, when the cell is conveyed into the main transport channel for passage to the I/O or return from the I/O, the file buffer connects the pneumatic supply to the main pneumatic transport tube to cause passage of a cell through it.

Thus, a file may be positioned for a receipt of a cell or withdrawal of a cell and the cell actually received from its associated buffer or brought from the file into its associated buffer without interference with the main pneumatic transport flow such that an overlap of pneumatic transport within the system can be accomplished.

For a more detailed description of the novel subject pneumatic storage and transport system, refer first to FIG. 1 wherein is shown an overall block diagram illustrative of the operation of the system. In FIG. 1 is shown three files 1, 2 and 3. The particular structure of these files will be discussed hereinafter in connection with FIG. 3. Each of the files 1, 2 and 3 is connected to a file buffer 4, 5 and 6, respectively. As will become clear from a consideration of the following description, the number of files is not important as far as the inventive concept herein set forth. Thus, any number of files can be provided. Likewise, while one I/O terminal will be shown in the subject system, any number of I/O terminals, of course, may be utilized.

In FIG. 1, file 1 is shown connected to its associated buffer 4 by means of a pneumatic tube 7. The pneumatic tubes in the system of FIG. 1 will have an interior cross section such that they can accommodate the carriers or cells which are utilized in the system. In the present system, the cell is of rectangular cross section such that the file tubes will be of rectangular interior cross section. The buffer 4 of file 1 is in turn connected to a pneumatic supply illustrated schematically by arrow 8. Likewise, the file buffers 5 and 6 are also connected to pneumatic supplies 9 and 10, respectively. As shown diagrammatically by the arrows 8, 9 and 10, the pneumatic supply is reversible. Buffer 4 is also connected by means of pneumatic tube 11 to file buffer 5. File buffer 5 is connected along pneumatic tube 12 to its associated file 2. File buffer 5 is connected by means of pneumatic tube 13 to file buffer 6 which also is connected by means of pneumatic tube 14 to file 3. File buffer 6 is connected along the pneumatic tube 15 to the I/O terminal 16 which is shown as being provided with a buffer 17. As will hereinafter become more clear, the I/O terminal need not have a buffer, but for increased systems flow, a buffer is desirable.

In operation, in the system of FIG. 1, a filed is connected to a pneumatic supply by its associated buffer. Consider, for purposes of illustration, file buffer 5 and its associated file 2. File 2 is in operative association along the pneumatic transport tube 12 with the file buffer 5. Selective application of a pneumatic supply, diagrammatically represented by the arrow 9, will provide a means of transporting cells within the file, as will later become more apparent, or, of transporting cells between the file and the file buffer 5 through the transport tube 12. All of this takes place without any interference with the main transport tube or path pneumatics which comprises tube sections 11, 13 and 15 along with the section or portion of the tube which resides within the buffers 4, 5 and 6 which is necessary to complete the main transport path through the buffer. When the file of a buffer is being supplied pneumatically by the file buffer for transporting a cell between it and the file or internally of the file, the main transport portion of the system is pneumatically isolated from the file buffer such that it is not affected. The file buffer, however, when it contains a cell which is to be delivered to the main transport channel, is operated such that the cell from the file is moved into alignment with the main transport channel. Application of pressure to the file buffer 5 then would cause the cell to be transported down through the main transport tube section 13, through file buffer 6 and the main transport tube section 15, into the I/O terminal 16. For return, the pneumatic supply would then be reversed and the cell would be brought back into the file buffer 5 and the file buffer operated such that the cell is then again in mechanical and pneumatic communication with the transport tube section 12 for return to the file. During the time that the file buffer 5 was in pneumatic communication with the main transport system, the other file buffers were effectively isolating their associated files such that they could in turn be bringing cells into them or returning cells such that systems efficiency through overlap is accomplished.

Refer next to FIG. 2 wherein is shown an isometric view of a cell. As will later be described, the cell constitutes the basic carrier of the herein described system. Stored in each cell are a number of chips which, as previously stated, may be either totally photographic or may be totally magnetic or may be a combination of the two. The chips are slidably held in slots 18 in the sides of the cell 19 and the cell itself is equipped with a removable lid 20 which is held on by means of grooves 21. Shown in FIG. 2A is a combination photographic and magnetic chip including an image area 22 and a magnetic stripe 23 along with openings 24 and 25 for picking the chip from the cell. An alignment groove is provided such that the openings 24 and 25 are centered relative to the picking mechanism. Likewise, contained in the chip is an orientation opening 27 for identifying which side of the emulsion of the image area is presented for exposure purposes. The chips, after removal from the cell at the I/O terminal, can be manipulated or operated on in any desirable way. The actual utilization of the chips is not part of the subject invention. However, for purposes of illustration, an I/O terminal is provided in the patent application entitled, "Image Storage and Retrieval Conversion System," by Jack O. Hildebrand, Ser. No. 504,338 assigned to the assignee of the subject invention. In this type of system with the type of chip shown in FIG. 2A, magnetic read, write and erase functions are performed on a selected chip after it has been removed from the cell by a picker arm and carriage mechanism. Additionally, the image data from the chip is transferred to a blank aperture card and the magnetic data punched into the card in the retrieval mode while alternately new chips may be entered into the file by reversing the above process and inserting the chips into an empty cell space. Upon completion of the I/O operation, the cell is returned to its tray location by reversing the pneumatic drive, as previously stated.

Refer next to FIG. 3 wherein is shown five drawers 30–34. Drawers 30 and 31 are shown separated from drawers 32, 33 and 34 only for purposes of illustrative description. In actuality, each of the drawers would be in pneumatic sealing relationship with the other to prevent loss of pneumatic supply. Each of the drawers as illustrated by drawer 31 contains a number of cell pockets which hold cells. The cell pockets are arranged in arrays of ten by fifteen. The arrays 36, 37 and 38 are separated by a column of through delivery pockets 39, 40 and 41. Each of the drawers 30–34 are selectively positionable by means, hereinafter described, into five positions on each side of a home position. When all of the drawers are in the 0 or home position, all of the columns of delivery channels, as exemplified by 39, 40 and 41, are in alignment such that through channels are provided up through the file to the carrier selection or accessing system.

In the following description, the movement of the trays or drawers, as viewed in the drawings, to the left will be considered in the plus direction and the movement of the drawers to the right will be considered in the minus direction. Thus, movement of a drawer a distance corresponding to the width of one cell pocket 35 will constitute movement to the +1 position; movement of a distance corresponding to two cell widths to the left will be referred to as a +2 position, etc. up through the +5 position. Thus, all references to movement of the drawers will be relative to the 0 or home position. In FIG. 3, drawer 31 is shown displaced one position to the left which is the +1 position. All of the +1 columns of cell pockets 42, 43 and 44 are in alignment with the through columns up through the file depicted generally by the dotted lines 45, 46 and 47, respectively.

Thus, application of vacuum to any of the delivery channels up through the file will cause the cell which is situated on or in alignment with it to be drawn up through the file. As illustrated in FIG. 3, with this +1 movement fifteen cell pockets of each of the three arrays are positioned over the file access columns such that any one of forty-five of the cells may be selectively drawn up through the file or a cell may be returned to any of the forty-five cell pockets. Likewise, positioning of the drawer into any of the other nine positions other than home will provide forty-five cells in alignment with the delivery channels up through the file.

Thus, to select any cell in the file the appropriate tray is moved horizontally to one of ten positions, relative to the home position until the desired cell is aligned with the nearest column of delivery channels up through the file, and the overhead pneumatic switching or accessing device is then moved and aligned such that the desired cell is selected.

The apparatus for selecting a cell lying on one of the columns of delivery channels 45, 46 or 47 will next be briefly described. The pneumatic accessing system shown in FIG. 3 includes four main units; three identical units, the column select sections 50, 51 and 52 and a row selector 53. Each column select section is made up of five column select segments each including a 90° elbow 54 with a straight or through tube 55 and 56 on each side of it. These five segments are ganged for movement. The row selector includes a prime opening 57 at one end thereof connected to the file I/O tube 58 and five openings which are associated with each of the five segments of the row or column select section 52. Each of the five openings in the row select is controlled by a deflector valve 59 which is selectively operable to connect one of the three tubes of each of the segments of the column select section 52 with file I/O tube 58 through the row select 53.

Each of the four units 50–53 has three fixed locations, a center position or 0 position and a +1 and a −1 position. When all of the units are at the 0 position, all of the elbows are in line and the five deflector controlled openings in the row selector 53 are lined up with the five elbows in the column select section 52. The spacing between the straight tubes and elbows is such that at whatever position the units are in, the straight tubes and/or elbows of the three column select sections 50–53 and the outlets in the row selector 54 are in alignment. The straight tubes in the column select section connect the row select and the selected elbows of the column select section spaced from the row selector. Each elbow covers three adjacent delivery channels. Thus, complete coverage of three columns of fifteen delivery channels may be obtained through selective movement of the four members between the 0, +1 or −1 positions along with selective manipulation of the five deflector valves 59 in the row select mechanism.

In operation, only one of the deflector valves in the row select 53 will be operated to access a desired cell which is in alignment with one of the elbows of the column select sections 50–52. In this manner, a single cell may be accessed from the file or returned to the file. A more detailed description of this type of pneumatic accessing system will be found in a patent application entitled "Pneumatic Carrier Accessing System," Ser. No. 490,040, by Bjarne Junge and Russell A. Stauffer, assigned to the assignee of the subject invention.

Refer next to FIG. 4 wherein is shown a mechanism for moving the trays of the file. As was previously pointed out, each of the five trays must be selectively moved to one of five positions on either side of the 0 or home position. Additionally, where automatic control is utilized, there must be some way of providing not only command signals to move the file to the selected position, but, additionally, sensing means must be provided for determining at which position the file is actually residing. The apparatus of FIG. 4 accomplishes the above.

In FIG. 4 is shown a rack 60 which is attached to one of the drawers 30–34 of the file. The following description will be in relation to a single drawer but, as is obvious, a number of similar type racks and moving mechanisms may be provided such that all five of the drawers are provided with means for selectively moving them. The rack 60 contains eleven detent notches 61 which correspond to the eleven positions of the drawers. As shown in FIG. 4, the rack is at the 0 or home position. A detent 62 is provided which is in operable association with each of the detent notches 61 for detenting the rack when it has been moved into a selected position. Shown connected to the detent actuator 63 is an energizing or control line 64. The actuator 63 is a solenoid, thus an electrical energizing potential is applied thereto along line 64 to energize it. The line 64 is connected to a decoder 65 which receives three inputs 66, 67 and 68. The decoder 65 is provided to facilitate automatic control in that a three level code would be required to drive the decoder such that it selects the one of the five actuators in the file positioning system which is to be actuated. Obviously, however, the line 64 to an actuator may be operated by a conventional switch or relay. The detent 62 is integral with the piston 69 which is pivotally connected with a linkage 70 at pivot point 71. In FIG. 4, the actuator is energized and the rack is detened at its home position. A spring 72 is provided such that the detent is spring biased outward from the rack 60. When the actuator 63 is de-energized, the detent 62 is withdrawn from the rack 60 and member 70 which is connected to the actuator piston 69 at pivot point 71, rotates about fixed pivot point 76 to cause linkage 73, which rotates about fixed pivot point 74, to pull the clutch rod 75 in the direction shown by arrow 77. The arrows associated with the drawing provide an indication as to the movement of the various linkages and members upon de-energization of the actuator. When clutch rod 75 is moved in the direction indicated by arrow 77, it moves from contact with the face of the clutch plates 78 to thereby release it which allows it, since it is spring biased by springs 79 and 80 to move in the direction of the movement of the clutch rod 75. This will cause the clutch dog 81 to enter into the single tooth ratchet 82. Thus, the shaft 83 has been clutched by the pulley designated generally at 84. The shaft 83 is a servo control jack shaft which is driven by a belt 84 by means of a pulley arrangement 85 and 86 by a servo motor 87. The servo motor 87 is selectively movable into any one of eleven positions corresponding to the desired locations of the rack which is connected to the trays. The motor is energized along line 88 by a servo control 89 which receives its input from a decoder 90 along line 91. To facilitate automatic control, the decoder, which may be of a conventional type, is driven by a four level code along lines 92, 93, 94 and 95. Obviously, however, any conventional type of method of providing a servo control signal along line 91 into the servo control could be utilized or a signal could be fed directly into the servo positioning motor 87 along line 88 from conventional means.

Thus, with the clutch engaged, the motor 87 can now rotate the jack shaft through the pulley arrangement 85 and 86 to cause the pulley member 84 to rotate in accordance with the input to the servo motor. The pulley 84 is connected by means of a metal tape 96 over pulleys 97 and 98 to the rack 60 such that the rotational movement of the pulley 84 is converted into linear movement for translating the rack 60 back and forth.

When the rack 60 arrives at the desired position, the detent is then energized to hold it at that position. As shown in FIG. 5, movement of the detent into the detent position will not cause the clutch to be disengaged since the high contact portion 78 of the clutch has been rotated out from alignment with the clutch rod 75. Thus, the clutch can be released only at the home position when the high contact portion 78 is again in alignment with the clutch rod 75. In this manner, it is assured that only one of the trays can be away from the home position at a time and that all the others are in the home position to provide a through column up through the file for a selected cell.

Again, to facilitate automatic control, a sense means is provided for determining which of the eleven positions the rack resides in. The sense means comprises eleven holes which are spaced a distance corresponding to the notches in the rack 60. A light source 100 and a photocell 101 are in optical association through the eleven holes 102 such that, as the rack is moved, a series of pulses will be generated by the photocell 101 and fed along line 102 into a counter 103 which will provide an indication as to the present location of the rack and drawer associated therewith along line 104.

Figure 6:
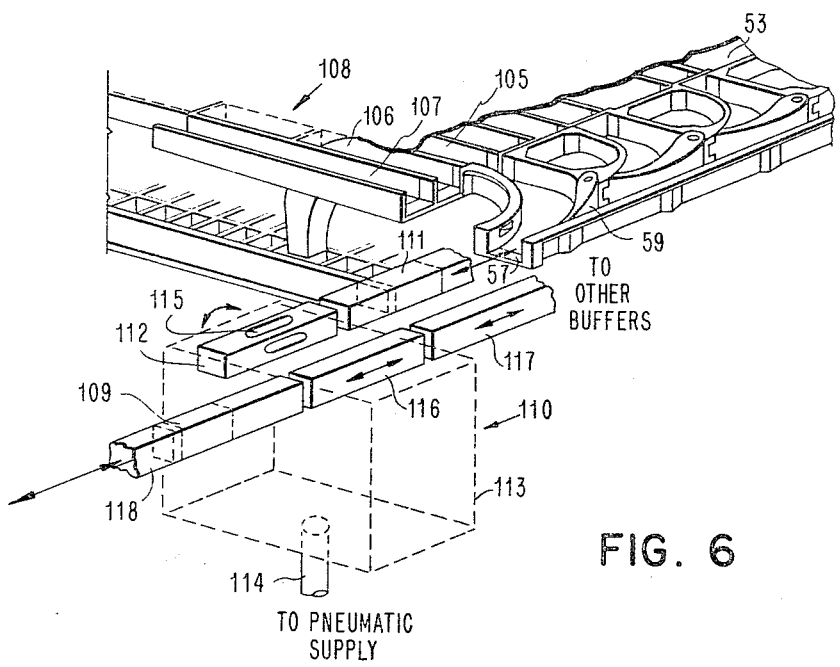
FIG. 6 is a cutaway isometric view of a portion of the file of FIG. 3, the cell pocket selection means, and a file buffer.

Refer next to FIG. 6 wherein is shown a more detailed view of the row select 53, which was briefly described in connection with FIG. 3. Also shown is a file buffer which enables the overlap of pneumatic operation in the herein described system. The deflector blades 59 in the row select 53 are shown operated such that the segment 108 is in selective communication with the file I/O tube 109 through the file buffer 110. In the position as shown in FIG. 6, the through tube section 105 has been selected. Movement of the segment 108 to the home position would position elbow 106 in alignment with the file I/O tube 109 through the file buffer while another movement in the same direction would position through tube section 108 in alignment with the file I/O tube 109 through the file buffer 110. Thus, a single deflector blade can service any of the three passages from the segment 108. The same will hold true with the other five segments which are also serviced by individual deflector blades. A cell will pass out of the prime opening 57 of the row select and will pass down the file tube 111 into the file buffer tube 112. The file buffer comprises an essentially airtight chamber 113. It is airtight except for the portions of it which communicate with the file and main transport tubes. When a cell passes from the file into the file buffer, it enters the buffer tube 112 and is decelerated therein into a position at the end of the buffer tube most remote from the file. The pneumatic supply, to cause a cell to be drawn from the file, is applied along tube 114 into the file by means of a conventional pneumatic supply control. Thus, vacuum will be applied through tube 114 which will enter the file through openings 115 in the buffer tube and row select 53. The vacuum will be applied down through the selected elbow to cause the desired cell to be drawn into the file buffer 110. With the file buffer in the position as shown in FIG. 6, its through tube section 116, is in alignment with the through tube portions of the system 117 and 118. This through tube section is sealed from the pneumatic conditions in the airtight enclosure 113 such that they do not interfere with the flow of cells through the main transport channel 117 and 118. When a cell in the buffer tube 112 is to be transported down the main transport channel, the buffer tube section is moved into alignment with sections 117 and 118 and pressure is then applied to the airtight enclosure 113 while the end of the buffer tube nearest the file is blocked off such that the cell is then transported out of the main transport channel 118 to the file I/O. For return, vacuum is applied to the buffer tube section through openings 115 to cause the cell to be drawn back down through tube 118 from the terminal to the file buffer which is then rotated and then pressure applied through openings 115 of the buffer tube section to cause the cell to return again to the file. A more complete description of this type of file buffer will be found in a patent application entitled, "Pneumatic Isolation Buffer," Serial No. 489,827, by Henry G. Hoehmann, Bjarne Junge and James L. Lyon, assigned to the assignee of the subject invention.

In summary, the herein described storage system includes at least one file, 1, 5 or 6 containing chips as the basic storage media which may carry either image or magnetic information or both. A plurality of chips are contained in a box like cell 19 and a plurality of cells are in turn contained in a tray 30–34. A number of trays are suspended above each other to make a file and each tray contains, in the embodiment described, three empty columns of delivery channels 45, 46, and 47 for through passage of cells. Each tray may be selectively driven back and forth in discrete steps to position a desired cell in alignment with the communicating through passages or delivery channels of the trays above. A network of pneumatic tubes 50–53 is carried in a deck above the trays and the tubes are also selectively movable to form a continuous passage up through the trays and out of the file for a selected cell. After being transported out of its file via the pneumatic passage, the selected cell then enters the file buffer 110. The pneumatic supply to the file is through the file buffer which effects transport of a selected cell between the file and the file buffer. A buffer 110 not only acts as a source of pneumatic supply for its associated file and its associated pneumatic section to cause passage of a cell between the file and the buffer but, additionally, when a cell is moved into the main transport channel 117 and 118 for passage to the I/O or return from the I/O, the file buffer provides the pneumatic source to the main pneumatic transport tube 117 and 118. Thus, a file may be positioned for receipt of a cell or withdrawal of a cell and the cell actually received from its associated buffer or brought from the file into its associated buffer without interference with the main pneumatic transport flow such that an overlap of pneumatic transport within the system can be achieved.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a storage and retrieval system wherein carriers containing data are stored in files, a transport system for transporting selected carriers from said files to a terminal comprising:
   a file buffer connected by pneumatic tubing to each of said files;
   a pneumatic supply operative through said pneumatic tubing for transporting selected carriers from said files into their associated file buffers; and
   means for transporting said selected carriers to said terminal from said file buffers.

2. The transport system of claim 1 wherein said means for transporting selected carriers from said buffers to said terminal comprises a pneumatic supply operative through pneumatic tubing connected between each of said file buffers and said terminal.

3. The transport system of claim 2 wherein said pneumatic supply for transporting a carrier from its file is selectively connectable through its file buffer to both the pneumatic tubing connecting each file to its associated file buffer and to the pneumatic tubing connecting each of said file buffers to said terminal.

4. The transport system of claim 3 wherein said file buffers are connected to said terminal by a single pneumatic main transport path.

5. The transport system of claim 4 wherein said file buffers are selectively operable such that only one file buffer at a time is in pneumatic communication with said terminal through said main transport path.

6. The transport system of claim 5 wherein each of said file buffers is connected to its associated file by a single pneumatic tube.

7. The transport system of claim 6 wherein said pneumatic supply is reversible and is selectively applied to each of said file buffers to transport selected cells from said files through their associated file buffers to said terminal and then returned from said terminal through said buffers to their individual files.

8. A storage system comprising:
   at least one file containing at least one tray of cells;
   a file buffer connected to each of said files;
   means for pneumatically transporting a selected cell from its tray into a file buffer connected to its file;
   a terminal; and
   a main transport path for pneumatically conveying said cells from said file buffers to said terminal and returning said cells from said terminal to said file buffers.

9. The storage system of claim 8 wherein said file buffers are operable to provide a pneumatic supply to convey a selected cell between its associated file and the file buffer and along the said main transport path between it and said terminal.

10. The storage system of claim 9 wherein said file buffers are further selectively operable to pneumatically isolate said main transport path from it while it is providing pneumatic supply for conveying cells between it and its associated file.

11. The storage system of claim 10 further including means for aligning the trays of drawers of each of said files to provide at least one access channel therethrough and position a selected cell in alignment with one of said access channels.

References Cited by the Examiner

UNITED STATES PATENTS

| | | | |
|---|---|---|---|
| 1,753,989 | 4/1930 | Hohne | 243—31 |
| 3,049,247 | 8/1962 | Lemelson | 214—16.4 |

EVON C. BLUNK, *Primary Examiner.*

H. C. HORNSBY, *Assistant Examiner.*